United States Patent [19]

Hirota et al.

[11] 4,365,499

[45] Dec. 28, 1982

[54] METHOD OF MANUFACTURING FORMED ARTICLES, EQUIPMENT FOR PRACTICING SAME, AND FORMED ARTICLES MANUFACTURED BY THE METHOD

[75] Inventors: Kazumi Hirota, Tokyo; Kikuo Matsuoka, Fujisawa, both of Japan

[73] Assignee: Toyo Seikan Kaisha, Limited, Tokyo, Japan

[21] Appl. No.: 135,831

[22] Filed: Mar. 31, 1980

Related U.S. Application Data

[62] Division of Ser. No. 921,162, Jul. 3, 1978, Pat. No. 4,225,553.

[30] Foreign Application Priority Data

Jul. 5, 1977 [JP] Japan .................................. 52-79532

[51] Int. Cl.³ ............................................ B21D 22/00
[52] U.S. Cl. ........................................ 72/351; 72/465
[58] Field of Search ................. 72/347, 349, 350, 351, 72/465, 466

[56] References Cited

U.S. PATENT DOCUMENTS

| 2,697,057 | 12/1954 | Senger et al. | 264/292 X |
| 2,843,071 | 7/1958 | Kitzinger | 72/351 |
| 2,980,046 | 4/1961 | McGregor et al. | 72/350 |
| 3,884,154 | 10/1974 | Bozel | 72/351 |

FOREIGN PATENT DOCUMENTS

2450624  5/1975  Fed. Rep. of Germany ........ 72/350

*Primary Examiner*—Leon Gilden
*Attorney, Agent, or Firm*—Martin A. Farber

[57] ABSTRACT

A thin sheet having a low rigidity is drawn while being depressed over the radiused corner of a die by elastic force or hydrostatic force to obtain a formed article whose sidewall part and flange part have no wrinkles. The force is applied through an annular rigid body on which elastic is exerted. The hardness of the rubber is preferably approximately 70 to 85 in accordance with ASTM D 2240 Durometer A. A laminate not more than about 200 μm in thickness and consisting of a thermoplastic resin film, aluminum foil and a heat-sealable resin film is drawn into a formed article or a container which is light in weight and suitable for containing foods, for instance.

11 Claims, 3 Drawing Figures

METHOD OF MANUFACTURING FORMED ARTICLES, EQUIPMENT FOR PRACTICING SAME, AND FORMED ARTICLES MANUFACTURED BY THE METHOD

This is a division of application Ser. No. 921,162 filed July 3, 1978, and now U.S. Pat. No. 4,225,553.

BACKGROUND OF THE INVENTION

This invention relates to a method of drawing a metal foil or sheet, or plastic film or sheet, or their laminate into formed articles, and equipment for practicing same and formed articles manufactured by the method. The present invention is directed more particularly to a method of drawing a metal foil or sheet, or a plastic film or sheet, or their laminate which is of the order of 7 to 200 $\mu$m in thickness and has a relatively low rigidity, into a formed article which has no wrinkles, and equipment for practicing same and formed articles manufactured by the method.

Containers extremely thin in wall thickness which are made of a metal foil or sheet such as aluminum foil or tin plate, or a plastic film or sheet, or their laminates, are extensively employed for packaging goods or medicines and so on. However, such containers have scarcely been formed by drawing. This is due to the following reasons: These foil, sheet, film and laminate, namely, blanks are less in rigidity. Accordingly, if the blanks are drawn by the ordinary drawing method, wrinkles are significantly created on the formed article or container or shell at the radiused corner of the die and are distributed substantially entirely over the flange and the sidewall portion of the shell. This will undoubtedly defile the appearance of the containers. In addition, it is impossible to hermetically seal the containers with their flange portions by lids so as to prevent leakage of the contents and deterioration of the contents due to entry of air and moisture.

In order to overcome this difficulty, a method is extensively employed in which, after heat-softened, a plastic film or sheet, or a composite film or sheet consisting of plastic materials is subjected to pressurized air forming or vacuum forming to produce a formed article. This method is a so-called bulging method which can be applied only to plastic films or sheets which extend 100% to 200% or more at heat-softened state. Accordingly, this method is disadvantageous in that a step of heating is required, and unlike drawing, it is impossible to subject the blank to cold forming which is carried out at room temperature or a temperature around the room temperature. It goes without saying that this method cannot be applicable to aluminum foil or tin foil.

In the case where containers are made of plastic only, it has been found that it is rather difficult to attain complete barrier for oxygen or moisture, that is, such containers are not suitable in the field of packaging foods to be preserved for a long time at room temperature where sophisticated technique is required. In order to eliminate this drawback, a laminate of aluminum foil, or the like, and plastic films or sheets has been provided recently. In this case, in view of material saving and cost reduction, the aluminum foil should be as thin as possible, but to the extent that the contents in the container is prevented from inroading of oxygen and moisture. Accordingly, laminates made of a thin aluminum foil 7 to 30 $\mu$m in thickness and polyester, polyethylene, polypropylene, nylon or polycarbonate films etc. several to several tens of $\mu$m in thickness have been provided to package foods or the like. However, since the laminate of this type contains aluminum foil, the elongation thereof is no more than several to 50%, and therefore manufacturing a formed article from the laminate in accordance with the above-described pressurized air or vacuum forming is practically impossible. Accordingly, such laminates are used mainly for manufacturing pouches.

In a drawing method, unlike a bulging method, the thickness of a blank sheet is scarcely changed during drawing, and the elongation of the blank needs not to be so high. Accordingly, in the drawing method, it is possible to obtain a formed article such as a cup by subjecting the aforementioned very thin metal foil or sheet, or a plastic film or sheet or laminates thereof to cold-drawing. However, in this conventional drawing, wrinkles are remarkably created on the formed article at the radiused corner of the die, and therefore heretofore it is impossible to manufacture formed articles which can be commercialized.

In other words, in the conventional drawing, when a blank is drawn into the die by the punch, the blank has a portion which is not restrained on the radiused corner of the die. However, in the case where the blank is sufficiently thicker than 200 $\mu$m and especially it is a metal sheet, the rigidity of the blank is considerably high, so that wrinkles are scarcely created on the formed article at the radiused corner. On the contrary, the rigidity of a plastic laminate thinner than 200 $\mu$m including a thin aluminum foil 7 to 30 $\mu$m is relatively low, and therefore if this plastic laminate is drawn in accordance with the conventional method, wrinkles will be necessarily created.

SUMMARY OF THE INVENTION

In view of the foregoing, a primary object of this invention is to provide a drawing method in which creation of wrinkles on a formed article at the radiused corner of the die is prevented.

A further object of the invention is to provide a drawing equipment in which a thin sheet having a relatively low rigidity can be drawn without creating wrinkles on a formed article at the radiused corner of the die.

A still further object of the invention is to provide a formed article fine in appearance without wrinkles which is obtained by drawing a metal foil or sheet, or a plastic film or sheet, or their laminate about 7 to 200 $\mu$m in thickness.

A specific object of the invention is to provide a formed article fine in appearance without wrinkles which is obtained by drawing a laminate consisting of a metal foil of about 7 to 30 $\mu$m and plastic films of several to about one hundred of $\mu$m in thickness.

In this invention, a force for resisting creation of wrinkles on a blank low in rigidity being drawn, that is, elastic force or hydrostatic is applied to the blank at the radiused corner of the die substantially throughout the drawing operation, thereby to provide a formed article having no wrinkles.

The novel features which are considered characteristic of this invention are set forth in the appended claims. This invention itself, however, as well as other objects and advantages thereof will be best understood by reference to the following detailed description of illustrative embodiment when read in conjunction with the accompanying drawings, in which like parts are designated by like reference numerals.

DETAILED DESCRIPTION OF THE INVENTION

Figure 1:
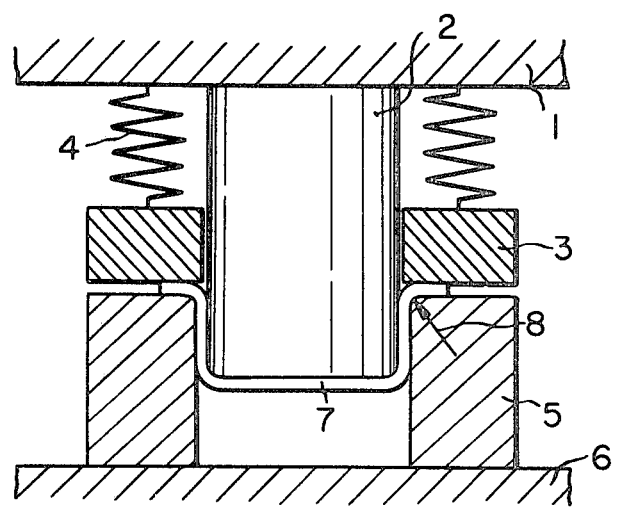
FIG. 1 is a sectional view for a description of a conventional drawing method.

FIG. 1 is an explanatory diagram for a description of a conventional drawing method. Referring to FIG. 1, a punch 2 is fixedly secured to a bolster 1, and a blank holder 3 is connected to the bolster 1 through a cushioning means 4 which utilizes a spring, pneumatic pressure or liquid pressure. A die 5 is affixed to a ram 6. In FIG. 1, the bolster and the ram are arranged above and below, respectively; however, the arrangement of them may be reversed. This can be applied to FIGS. 2 and 3. A blank to be drawn, or a thin sheet 7 (hereinafter referred to as "a workpiece 7" when applicable) is clamped between the blank holder 3 and the die 5 under a suitable pressure, and is then drawn as the punch enters the die. In this drawing operation, no force is exerted on a portion of the sheet 7, which lies on the radiused corner 8 of the die 5, by the blank holder 3, and therefore the portion is in a so-called free state until the punch 2 is brought into contact therewith. Consequently, wrinkles will be produced on the portion by circumferential compressive force, if the sheet is a thin one having a low bending rigidity.

In this invention, the above-described difficulty is eliminated by using a drawing machine described below, and particularly a punch described below in the drawing machine. That is, the drawing machine comprises a punch and a die having a cavity corresponding to the punch, so that a thin sheet is drawn into the cavity of the die by the punch thereby to form a formed article.

Figure 2:
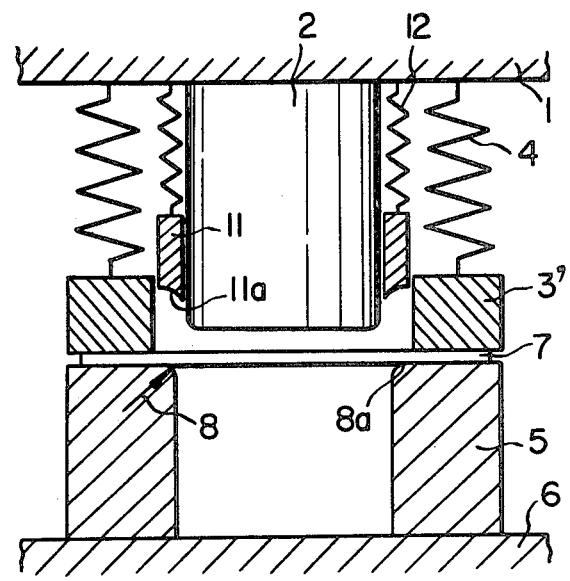
FIGS. 2 and 3 are sectional views showing an embodiment of the invention.

Shown in FIG. 2 is an embodiment of this invention in which an additional means for restraining a workpiece at the radiused corner of a die is employed.

The drawing machine shown in FIG. 2 comprises a punch, and a die having a cavity corresponding to the punch, so that a thin sheet having a relatively low rigidity is drawn into the cavity of the die to form a formed article or a shell. This drawing machine further comprises a depressing member in the form of an annular rigid body, is movably placed around the punch. In a drawing operation, the depressing member is brought into contact with the surface of the sheet, which is opposite to a face of the sheet which is brought into contact with the radiused corner of the die, so that the sheet is depressed over the radiused corner of the die by the elastic or hydraulic force through the depressing member substantially throughout the drawing. In this embodiment, an ordinary punch 2 is employed and in addition to a blank holder 3', the depressing member 11 is connected through a cushioning member 12 such as springs, pneumatic or hydraulic pressure devices to a bolster 1 so as to prevent creation of wrinkles on workpieces.

The depressing member 11 operates to slide along the outer wall of the punch 2. The outside diameter of the depressing member 11 is substantially equal to the diameter of a circle 8a which is formed by the intersecting line of the die radiused corner 8 and the upper plane of the die. The lower end surface 11a of the depressing member 11 is so formed as to substantially conform to the shape of the die radiused corner 8 so that the elastic or hydraulic pressure is uniformly applied to the die radiused corner 8.

In drawing operation, first only the punch 2 depresses the work-piece 7. As soon as the work-piece 7 is brought into contact with the entire die radiused corner 8, the cushioning member 12 is operated to move the depressing member 11. As a result, the lower end surface 11a of the depressing member 11 depresses the upper surface, as viewed in the FIG. 3, of the portion of the work-piece which is in contact with the die radiused corner 8. This depression is carried out until the drawing is completed.

Figure 3:
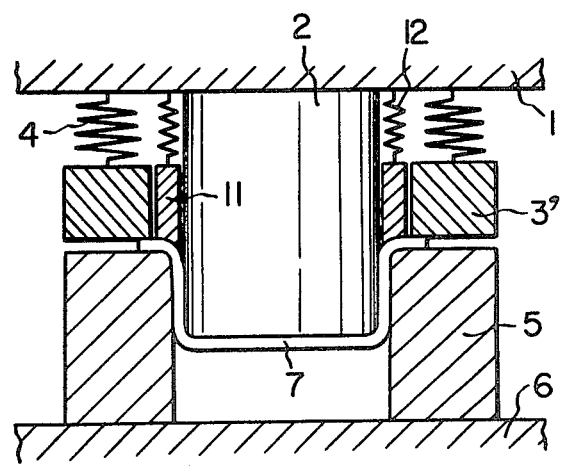

FIG. 3 shows a state of the work-piece which has been drawn by the drawing machine. The pressure generated by the cushioning member 12 is applied through the depressing corner 11 to the work-piece to prevent creation of wrinkles thereon.

The invention has been described with the particular embodiment: however, it should be noted that the invention is not limited thereto or thereby. A blank, such as a metal foil or thin sheet, to be employed according to the present invention may be iron, steel, copper and nickel sheets or tin plate, or sheets made of alloys of these materials, or such sheets coated with lacquers or subjected to surface treatment. A blank, such as a plastic film or sheet, to be employed in this invention may be polypropylene, nylon and polycarbonate sheets or their laminates. Polyester or polycarbonate sheets can be solely drawn because they can be subjected to cold forming.

The method and equipment according to the invention is most applicable to a film laminate less than about 200 $\mu$m which consists of an aluminum foil about 7–30 $\mu$m in thickness and plastic films covering the two surfaces of the aluminum foil.

If the surface of the laminate which is brought into contact with the punch during the drawing operation, that is, the layer of the laminate which is the inner surface of the formed article is of heat-sealable resin, a sealed container light in weight can be obtained with its lid heat sealed. This container can be subjected to retort sterilization, and, therefore, it is suitable as a container for foods, beverages and the like which can be preserved at room temperature. The heat-sealable resin may be polyolefins such as polyethylene and polypropylene, or nylon 11 or nylon 12 or polyester ether resin or their copolymers and blends, for instance.

The plastic film of the laminate which is brought into contact with the die serves to protect the intermediate layer or the aluminum foil from corrosion, to improve lubrication in drawing, and to maintain the configuration of a formed article.

Plastics preferable for this purpose are oriented or non-oriented polyethylene terephthalate, polyimid resin, polypropylene, polycarbonate, and their copolymers and blends, and furthermore other cold-formable synthetic resins.

The term "foil" or "film" as used herein is, in general, intended to mean a foil or film thinner than 100 $\mu$m, and the term "sheet" means a sheet thicker than 100 $\mu$m. The present invention is most suitable for drawing a thin work-piece having relatively low rigidity whose thickness is less than about 200 $\mu$m. An indicated in Table 2, the present invention is sufficiently applicable to sheets ranged from 20 μm to about 200 μm in thickness.

The embodiment of the invention has been described with reference to normal drawing. However, it should be noted that the invention can be applied to deep-drawing as well as drawing-bulging in which the bottom of a formed article is subjected to bulging, to the extent that the article is not broken.

The method and equipment according to the invention can draw a thin sheet into various configurations of the sidewall section such as circle, ellipse, corner-rounded triangle, rectangle, hexagon, and corner-rounded polygon.

The forming temperature is not always limited to room temperature; that is, it may be higher than room temperature where required, if it does not damage a work piece and the elastic wall such as rubber employed for the punch.

As is apparent from the above description, according to the invention work-pieces such as metal foils or sheets or plastic films or sheets or their laminates which are relatively low in rigidity can be drawn into beautiful shells such as containers without wrinkles, although production of such articles has been impossible by the conventional method. Since the container produced according to the invention has no wrinkles, the container can be hermetically sealed with its flange and the lid. Accordingly, the containers are most suitable for cooked foods or medicines and so forth which should preserved for a long time at room temperature and should be prevented from inroading of oxygen and moisture.

What is claimed is:

1. A drawing machine comprising:
    a punch, and a die having a cavity formed therein corresponding to said punch and having a radiused corner, said punch for drawing a thin sheet having a relatively low rigidity into said cavity in said die to manufacture a formed article, and
    means comprising a depressing member having an end surface of the depressing member being formed substantially conforming to the shape of the radiused corner which is disposed movable around said punch in such a manner that said end surface of said depressing member is brought to cooperate with said radiused corner with said thin sheet therebetween into contact with a surface of said thin sheet which is opposite to a face of said thin sheet which is brought into contact with the radiused corner of said die and said sheet is depressed by said depressing member substantially throughout the drawing.

2. The drawing machine as claimed in claim 1, in which said depressing member is an annular rigid body.

3. The drawing machine according to claim 1, further comprising:
    a blank holder means for operatively holding edges of said sheet against said die during the drawing.

4. The drawing machine according to claim 3, further comprising:
    a bolster,
    said punch is connected rigidly to said bolster,
    cushioning means connects said blank holder means to said bolster.

5. The drawing machine according to claim 3, wherein:
    said blank holder means is for holding said edges of said sheet initially before the drawing as well as during the drawing.

6. The drawing machine according to claim 5, wherein
    said blank holder means further for permitting slipping of said edges during the drawing.

7. The drawing machine according to claim 1, wherein:
    said end surface is a lower surface of said depressing member defining an annular, substantially radially outwardly and downwardly facing concave surface substantially complementary to said radiused corner of said die.

8. The drawing machine according to claim 7, wherein:
    said depressing member has an outside diameter substantially equal to the diameter of a circle formed by an intersecting line of the radiused corner of the die and an upper plane of the die.

9. The drawing machine according to claim 1, wherein:
    said depressing member has a lowermost end which is always higher than a lowermost end of said punch.

10. The drawing machine according to claim 1, further comprising:
    cushioning means for connecting said depressing member movably relative to said punch.

11. The drawing machine according to claim 10, further comprising:
    a bolster,
    said punch is connected rigidly to said bolster,
    said cushioning means is connected to said bolster.

* * * * *